May 25, 1937.          J. C. WEEMS                2,081,784
COMBINATION PLANTER AND FERTILIZER DISTRIBUTOR
Filed Jan. 6, 1936              2 Sheets-Sheet 1
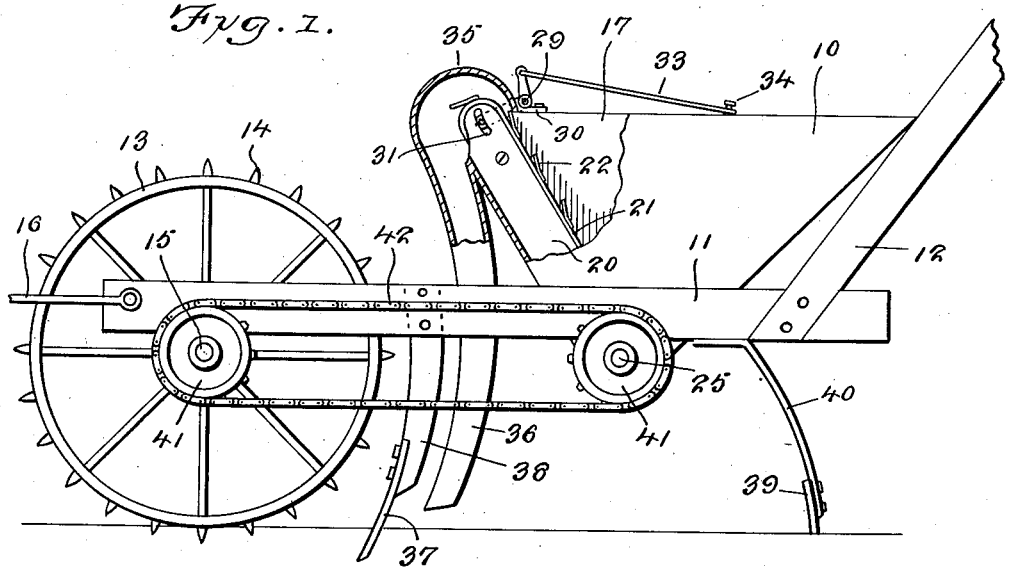
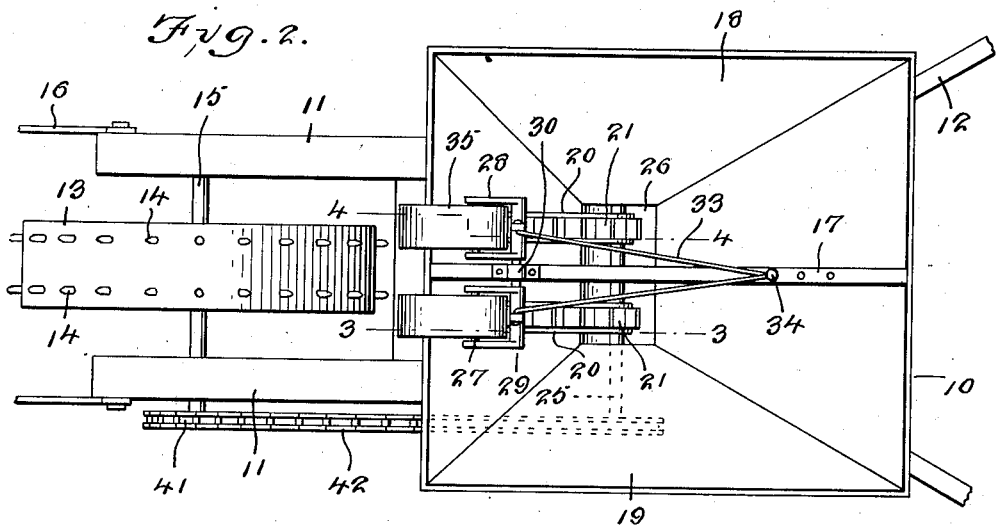
John C. Weems
INVENTOR
BY Victor J. Evans & Co.
ATTORNEY

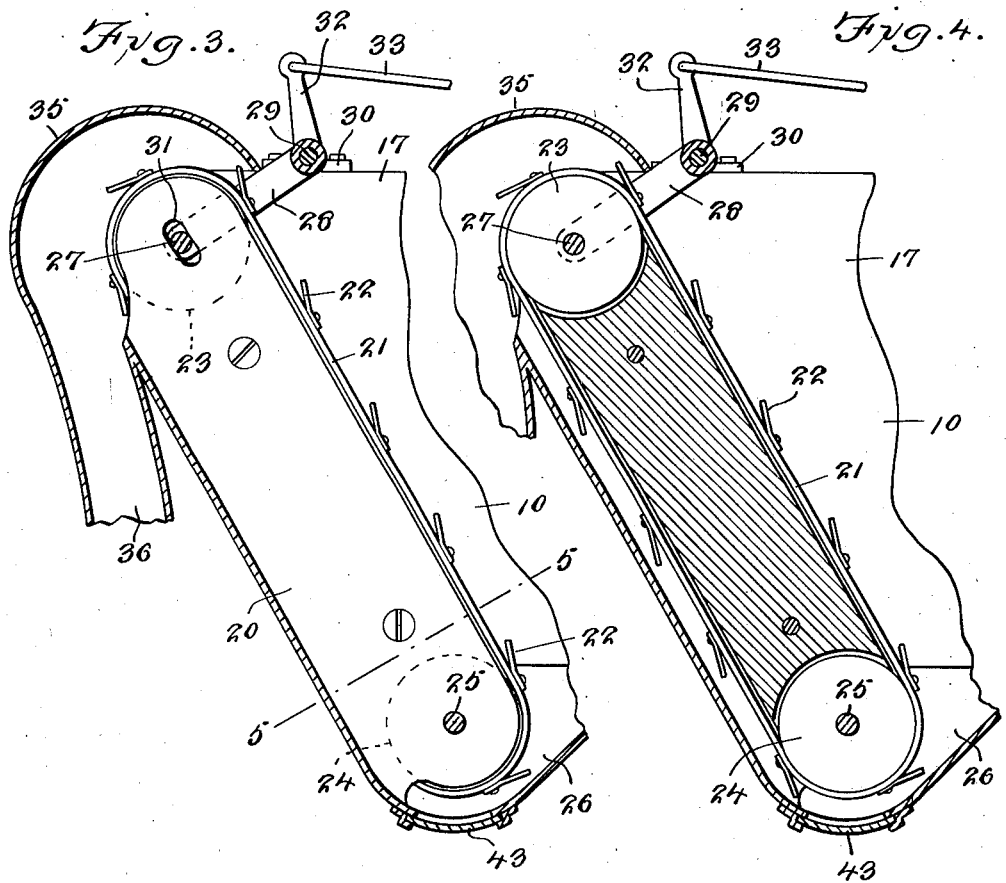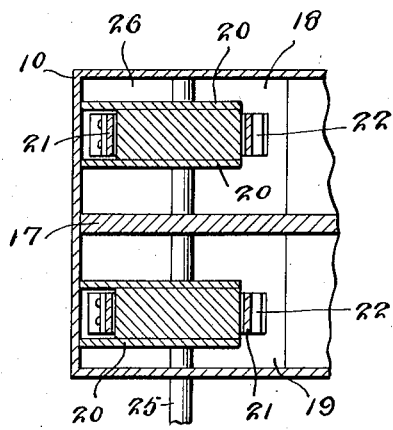

Patented May 25, 1937

2,081,784

UNITED STATES PATENT OFFICE 2,081,784

COMBINATION PLANTER AND FERTILIZER DISTRIBUTOR

John Clifton Weems, White Hall, Ala.

Application January 6, 1936, Serial No. 57,841

1 Claim. (Cl. 111—73)

The invention relates to a farm implement or machine and more especially to a combined planter and fertilizer distributor.

The primary object of the invention is the provision of a machine of this character, wherein a double row of seeds or seed and fertilizer in double rows can be planted with dispatch and ease, the machine being of the draft type and is novel in construction.

Another object of the invention is the provision of a machine of this character, wherein the feed hopper thereof can be readily cleaned to remove unused seed, fertilizer or the like and in the operation a double row of seed can be sown with dispatch.

A further object of the invention is the provision of a machine of this character, which is simple in construction, thoroughly reliable and efficient in its operation, readily and easily handled in the sowing of crops and the distribution of fertilizer, strong, durable, and inexpensive to manufacture.

With these and other objects in view, the invention consists in the features of construction, combination and arrangement of parts as will be hereinafter more fully described, illustrated in the accompanying drawings, which disclose the preferred embodiment of the invention and pointed out in the claim hereunto appended.

In the accompanying drawings:

Figure 1 is a side elevation of a machine constructed in accordance with the invention, a portion thereof being broken away.

Figure 2 is a top plan view.

Figure 3 is an enlarged fragmentary sectional view taken on the line 3—3 of Figure 2.

Figure 4 is a view similar to Figure 3 and is on the line 4—4 of Figure 2.

Figure 5 is a sectional view on the line 5—5 of Figure 3.

Similar reference characters indicate corresponding parts throughout the several views in the drawings.

Referring to the drawings in detail, the machine comprises a feed hopper 10 which is supported between a pair of spaced parallel beams or sills 11 constituting the frame and rearwardly of this hopper 10 rise handle bars 12, these being bolted or otherwise secured to the sills or beams 11. At the forward end portion of the frame including the beams or sills 11 is a relatively broad tread ground wheel 13, it having a double row of calks 14 to assure a firm grip with the ground when the machine is moved, the axle 15 for the wheel 13 being suitably journaled with the sills or beams 11. Attached to the forward end of the beams or sills is a hitch 16 for the draft of the machine.

The hopper 10 interiorly thereof at the longitudinal center is fitted with a partition 17 dividing the hopper into two compartments 18 and 19, respectively, and in these will be accommodated seed or fertilizer or both.

Built within the hopper 10 is a pair of elevators, each including spaced side shields 20 for endless conveyor belts 21 carrying spaced lifters or buckets 22 and such belts are trained over upper and lower belt pulleys 23 and 24, respectively, the latter being made fast to a driven shaft 25 suitably journaled in the hopper 10 and extending transversely of a pocket 26 at the lowermost portion thereof, the shaft 25 being common to both lower belt pulleys 24 while each upper pulley 23 has its journal 27 carried in a fork 28 pivoted at 29 in a bearing 30 on the upper edge of the partition 17, the shields, each being provided with an arcuate slot 31 constituting a clearance for the journal 27 for the upper pulley so that on the swinging of the fork 28 the conveyor belt 21 can be slackened or tightened. The fork 28 has formed therewith an arm 32 to which is connected a pull cord 33 extended rearwardly within convenient reach of the operative so that the conveyor belt can be tightened and slackened by the latter, it being preferable to have the cords 33 attachable to a holding pin 34 on the partition 17.

These conveyor belts 21 operate in the respective compartments 18 and 19 and have their upper ends extended into elbows 35 of feed discharge funnels 36 which depend in the direction of the soil and in advance of the hopper 10 but rearwardly with respect to a digger point 37 carried upon a hanger or standard 38 fixed to and depending from the frame carrying the said hopper 10. This point 37 opens the furrow for receiving seed, fertilizer or the like as delivered from the hopper 10.

Aft with relation to the point 37 is a scraper or cover plow 39, it being carried by a standard 40 also fixed to the frame of the machine.

The shafts 15 and 25, respectively, carry sprocket wheels 41 over which is trained an endless sprocket chain 42 so that when the wheel 13 rotates motion will be imparted to the belts 21 for the working of the elevators or conveyors within the compartments 18 and 19 of the hopper 10.

The hopper 10 next to the pocket 26 therein carries a gate 43 which when opened permits the draining or the removal of the unused material, such as seed or fertilizer within said hopper.

The compartments 18 and 19 in the hopper 10 can contain seed or fertilizer or both of these mixed so that a crop when planted can be seeded and fertilized in a single operation of the machine.

What is claimed is:

A machine of the character described comprising a hopper having a partition interiorly dividing it into independent compartments, pairs of upper and lower belt pulleys arranged within the respective compartments, journals for said belt pulleys, swinging forks mounted at the top of the hopper and fitted with the journal for the upper pulleys, endless belts trained over the pulleys, lifter buckets on said belts, shields arranged at opposite sides of the pulleys and fixed relative thereto, said shields having clearances for the journal of the upper pulleys, a pocket formed at the bottom of said hopper for accommodating the belt therein, elbows about the upper pulleys and having discharge funnels directed downwardly exteriorly of said hopper, a digger point supported in advance of the lower ends of said funnels, the shields being cut away for a distance within said pocket, and selectively adjustable means for fastening the forks in a fixed position.

JOHN CLIFTON WEEMS.